Figure 3:
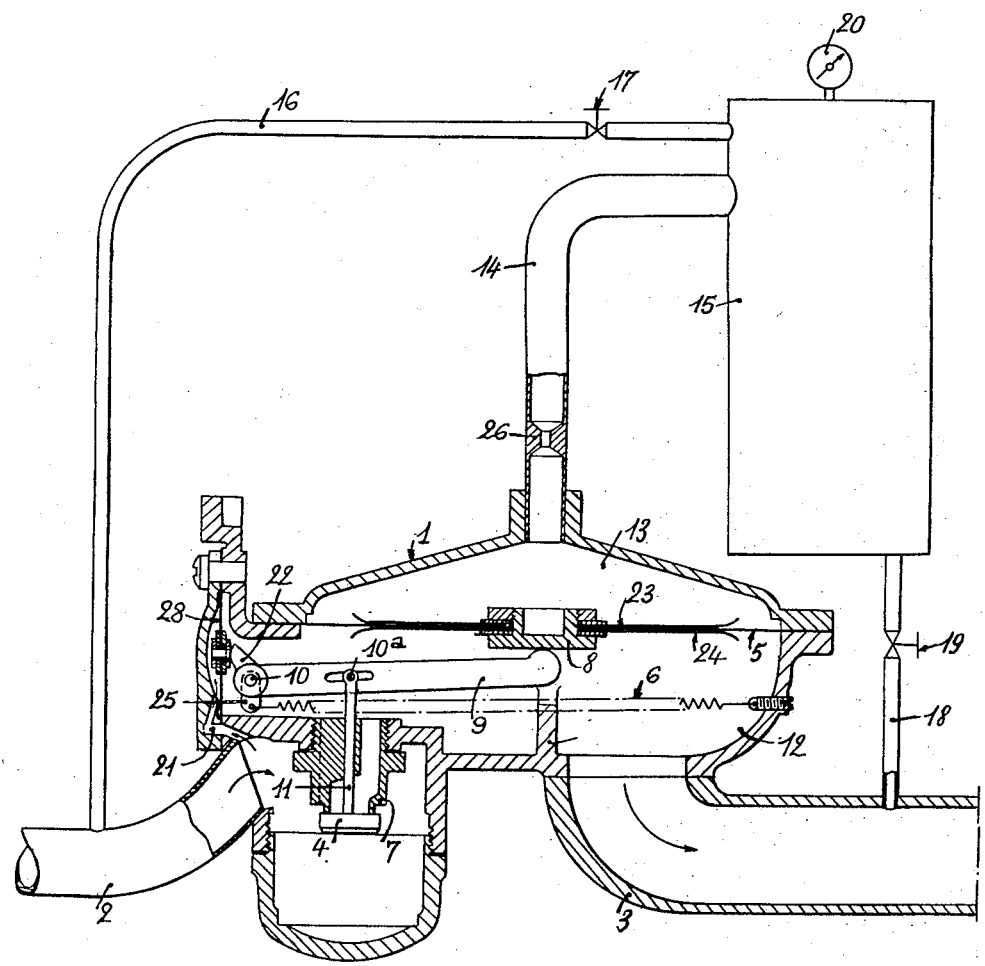

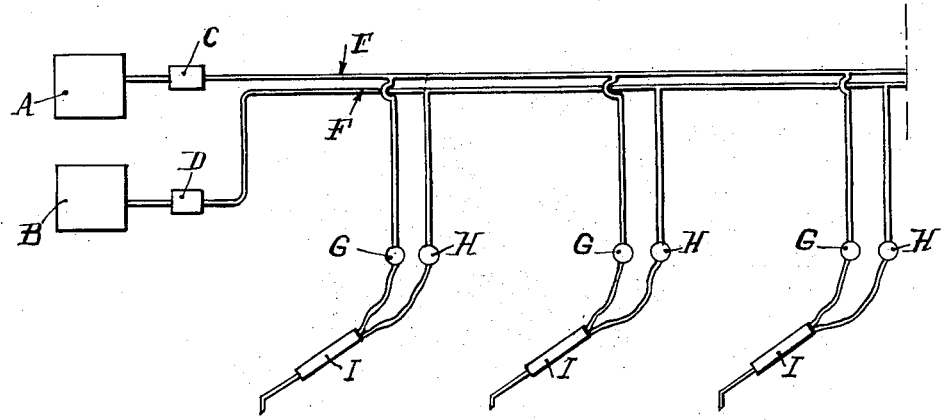
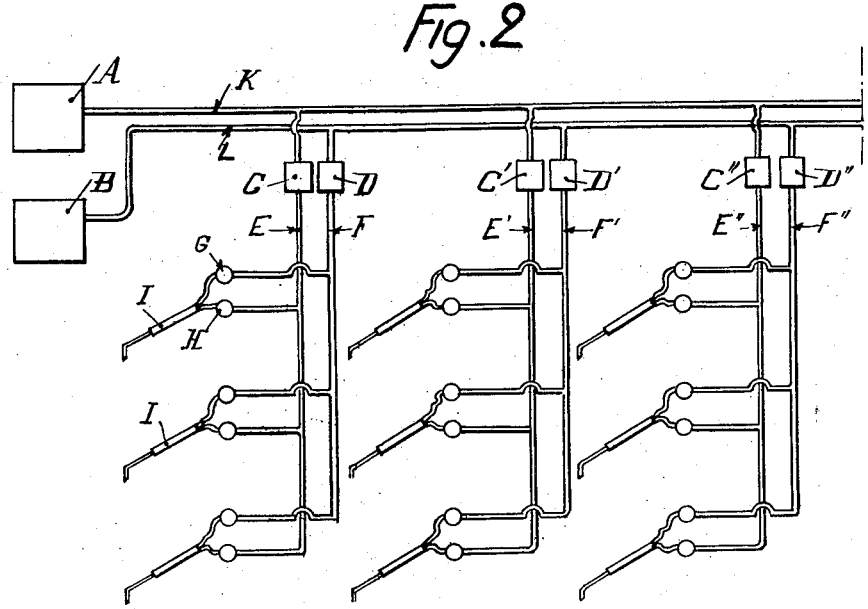

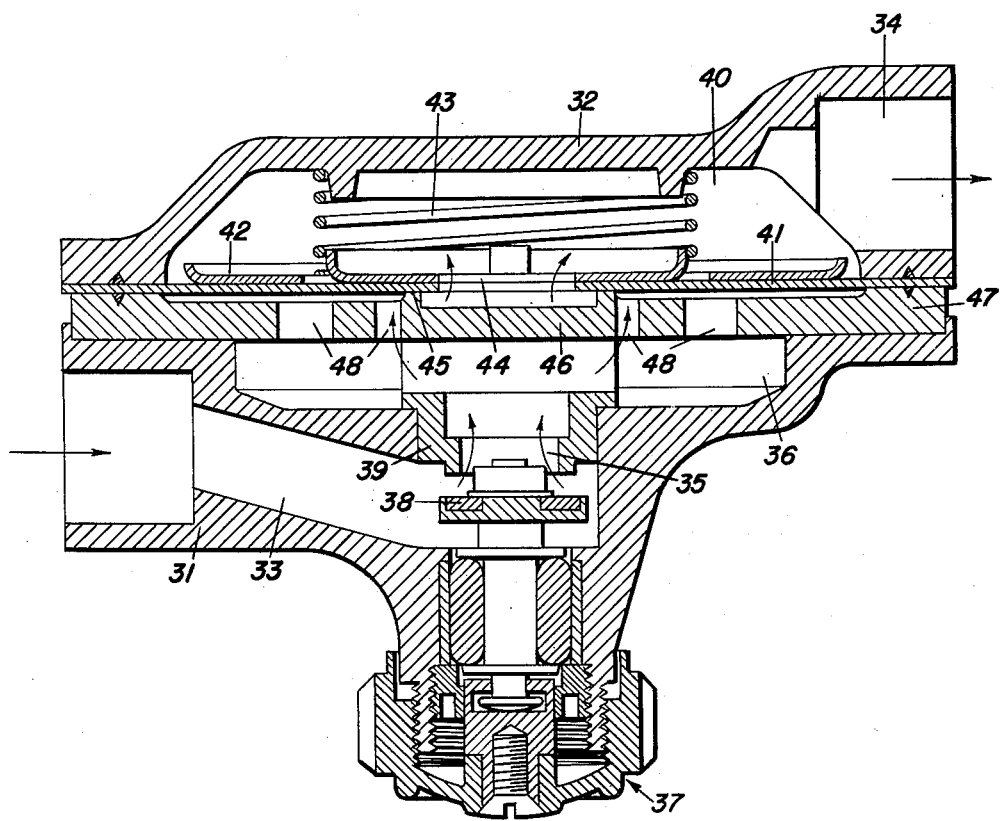

Patented Dec. 12, 1950

2,533,729

UNITED STATES PATENT OFFICE 2,533,729

OXYACETYLENE INSTALLATION FOR WELDING, CUTTING, OR THE LIKE

Robert René Louis Geffroy, Neuilly-sur-Seine, France, assignor to Société: Volcan S. A., Levallois, France Application February 23, 1946, Serial No. 649,704
In France July 11, 1945

8 Claims. (Cl. 158—27.4)

The invention relates to supply and distribution systems for a fuel gas and a combustion supporting gas, and particularly to systems which supply acetylene and oxygen to oxyacetylene blowpipes for welding, cutting (heating flame), case hardening, rapid heating of metal parts etc. For certain of this work (welding and case hardening particularly) the adjustment of the flame and the stability of this adjustment have a very great technical importance, any variation in the flame causing grave disadvantages, such as, oxidation, burning, loss of time, the necessity for retouching or rejected parts according to circumstances.

Moreover the errors of adjustment and the instability of adjustment have an important economic significance since they involve waste of oxygen and sometimes of acetylene and loss of time.

In known installations the source of acetylene (a generator for example) and the source of oxygen (oxygen expansion plant for example) are generally provided with a device for regulating the pressure of distribution. The regulating devices commonly used allow the regulated gas pressures to vary with the rate of gas flow. Moreover, substantial pressure drops often occur due to fluid friction and flow resistance in the distribution conduits so that the pressures of the gases at the blowpipes vary with the rate of gas flow and with the distance of the blowpipes from the main pressure regulators. These different pressure variations necessitate the use at each consuming point of individual regulators so as to adjust the gas supply to the flame against all the errors.

Finally, the blowpipe employed is often so constructed as to be unstable in adjustment. This is the case, for instance, with the very common blowpipes comprising an oxygen injector, in which any disturbance in operation, such as heating of the nozzle or the projection of slag into the gas outlet orifices, always produces a reduction of the gas entrained, that is, the acetylene, the output of the propelling gas, that is, the oxygen, being normally maintained.

In such installations, provision for adjustment of the flame of each blowpipe by means of an individual regulator is indispensable. Furthermore, it depends largely on the skill and vigilance of the operator. In fact, the instability of this adjustment, due both to the lack of sensitivity and precision of the individual regulators and to the behavior of the blowpipe, necessitates continual retouching of the work. The appreciation of the necessity for such correction and its proper performance are dependent on the competence and good will of the operator.

The invention has for its object to provide an oxyacetylene installation comprising apparatus for establishing at a fixed value the pressures of the gases supplied to the blowpipe or blowpipes and taking away from the operator substantially all control over those pressures, thereby assuring to each flame a constant adjustment during its operation. The operator is allowed only a small margin of control over the pressure of one of the two gases, just sufficient to permit him to adjust the flame when the blowpipe is cold and to correct its adjustment as the blowpipe becomes heated.

Obviously the choice of the type of flame to be employed (high or low pressure, elongated or short form and so on) depends upon the competence of the operator or of the foreman, the invention having solely for its object to improve the method of gas supply in order to avoid the necessity of continual attention to the supply pressure and readjustment thereof, thereby avoiding the disadvantages referred to namely:

(a) Technical disadvantages: oxidation, burning, loss of time, necessity for retouching, rejected parts, etc., according to circumstances.

(b) Economic disadvantages: loss of time, loss of oxygen, and sometimes loss of acetylene.

The invention aims moreover at simplifying the installation and reducing the cost thereof by dispensing with individual regulators, retaining only main regulators in the piping, so that the installation comprises simply a source of oxygen, a main pressure regulator associated with the oxygen source, a source of acetylene, another main pressure regulator associated with the acetylene source, and a distributing system connected between the outlets of these regulators and the blowpipes, without individual pressure regulators at the blowpipes.

This simplified solution requires the use of suitable equipment so that the blowpipes will always be supplied in all circumstances at constant pressure and so that these constant pressure blowpipes will operate correctly over the required range of variation of the rate of gas flow.

The selection of the blowpipe is thus an important element for the carrying out of the invention. If, for example, the blowpipe operates correctly under a certain pressure and with an output per hour of 50 litres of acetylene for welding thin metal sheets in light alloys, it is also necessary that it should function correctly under the same pressure with an hourly output of 3000 litres of acetylene for welding large foundry parts for example.

There are commercially available blowpipes with interchangeable nozzles in which the gas inlet orifices and the mixing chambers are so calibrated that the optimum supply pressure is the same for all outputs. In such blowpipes, the supply pressure is fixed at a value as low as possible in order to eliminate those defects in the stability of regulation which are common in the case of blowpipes supplied under high pressures or with an injection member. The gauge pressure of each gas in such a constant pressure blowpipe is, for example, less than 1 kg./cm.².

It is necessary to provide a distributing pipe system for each gas, of which all the elements: length, section, bends, accessories, cocks, etc., are arranged so that the drop in pressure between the regulator and the blowpipes is minimized.

The pressure adjustment and regulating apparatus hitherto employed in such systems has not been capable of regulating the pressure so that it is independent of variations in the rate of flow and in the pressure of the source. I have described in my co-pending now abandoned patent application filed Oct. 5, 1945, under Serial No. 620,600, entitled "Gas Pressure Regulators," and assigned to the assignee of the present application, a pressure regulator which maintains the pressure constant regardless of changes in the rate of flow and in the gas supply pressure. That regulator includes a valve, a compensating diaphragm associated with the valve so as to balance it against pressure variations on its upstream side, and a main diaphragm for operating the valve, which main diaphragm is subject to the regulated gas pressure on one side and to a substantially constant fluid pressure on its opposite side.

In order to avoid explosions which might be caused by the accidental return flow of gas due to conditions occurring in operation, such as the plugging of the nozzle of a blowpipe, there are provided, in the gas supply lines of each blowpipe devices for preventing accidental return flow of gas. These devices must be so constructed that during normal flow they do not cause an appreciable drop in pressure. A suitable device is described in my copending application Serial No. 609,371, filed August 7, 1945, now Patent No. 2,494,653, granted Jan. 17, 1950 entitled "Check Valves" and assigned to the assignee of the present application. Finally, it is desirable to provide a shut-off valve in each gas line at each consuming station. These shut-off valves may be dimensioned to prevent any appreciable loss of pressure.

Other characteristics of the invention will be understood from the following description, referring to the accompanying drawings which show, by way of example, various embodiments and aspects of the invention. Figs. 1 and 2 are diagrammatic views of two gas distribution systems embodying the invention. Fig. 3 is a section of a pressure regulator adapted for use in such a system. Fig. 4 is a section of a non-return valve for use in such a system.

Referring to Fig. 1 which represents diagrammatically an oxy-acetylene plant, the source of acetylene A may be any known means for supplying acetylene at a pressure generally between 300 and 1500 grs./cm.². For example, it may be a generator of acetylene under pressure, a generator of the low pressure type together with a pressure booster, or an expansion plant for dissolved acetylene.

The source of oxygen B may likewise be any known means for supplying oxygen at pressures of the same order, generally between 300 and 1500 gr. per sq. cm. For example, it may be an oxygen generator, an apparatus for distillation of liquid air, a reservoir under high pressure provided with expansion means, a reservoir without pressure provided with pressure boosting means, etc.

At the inlet of each gas distributing system is disposed a regulator C or D, arranged to provide a constant downstream pressure for all variations in the rate of flow within the established limits and unaffected by variations of the upstream pressure. For example, with an established range of flow variation, with upstream pressures varying from 400 or 600 to 1000 grams and with a downstream pressure regulated to a definite value between 300 and 500 grams per sq. cm. such a regulator should limit the maximum variation of the downstream pressure to 15 to 25 gr. per. sq. cm., say 5% of the value of this downstream pressure. Such a regulator will be described in detail below in connection with Fig. 3.

At the outlet of the respective regulators are connected the acetylene and oxygen distributing pipes E and F which supply each consuming station. These pipes are carefully arranged to reduce to a minimum the drop in pressure therein. Their section, their length, their internal condition, the bends and joints and other factors are so designed that at each consuming station, for the highest intended rate of flow, there is obtained a pressure practically identical with the pressure of regulation immediately at the outlet of the regulators C and D. In practice, the maximum allowable loss of pressure between the regulators C and D and the most distant stations is 5% of the pressure at the regulator.

Under these conditions the branch control members G and H for the blowpipe I of each consuming station need not comprise any pressure regulating device since within the limits of maximum pressure variation indicated above, the pressure will be practically constant. These control members G and H obviously may be dimensioned so as to produce only a negligible drop in pressure even at the highest established rate of gas flow. These members may be constituted by simple cocks, or preferably, in order to prevent the formation of any explosive mixture in either of the two branches E and F, these cocks may be supplemented by a non-return valve arrangement. This suggests two possible types of devices for the control members G and H: one in which the non-return device produces no appreciable drop in pressure, as is the case in the device to be hereinafter described in connection with Fig. 3, and another in which the non-return device, comprising a hydraulic coupling for example, produces a very substantial pressure drop. In the latter case, it is essential that this pressure drop should be practically constant throughout the whole range of outputs possible at each of the stations so as not to cause variations in the pressure at the inlet of the blowpipes. The fixed pressure drop for all outputs may then be taken into account in the adjustment of the apparatus C and D to ensure the desired pressure at the burner.

The blowpipe I should be of a type which is not affected by the usual disturbing factors, notably the heating of the nozzle, dust in the mixture orifice, etc. Burners are known which are suited to resist such disturbances. In such blowpipes the gases are supplied at a fixed pressure, recommended by the manufacturer, which will produce the correct supply of the gases for the flame outlet nozzles. Such a blowpipe has a gas mixing device member carefully constructed and incapable of being put out of adjustment.

Obviously all the burners supplied from the same source must be constructed so that whatever their locations, the gas pressures at their inlets will be identical. The whole of this installation responds to the conditions explained above.

The pressure regulators maintain suitable pressures in the piping corresponding to the optimum operation of the blowpipes, for all variations of flow and of the supply pressure in the sources A and B.

Careful arrangement of the piping E and F avoids any substantial pressure drop therein.

The burner thus supplied is under the best conditions for operation since it always receives the two gases at the pressures recommended by the manufacturer.

The operator is required to make only minor adjustments of the flame. For this purpose one of the two regulating members C and D is arranged to provide in one or other of the pipes E and F a pressure very slightly higher than the figure fixed by the manufacturer. For example, an excess pressure of the order of 50 gm./cm.$^2$ may be used.

Fig. 2 shows an oxy-acetylene installation intended for workshops extending over the large area.

In this example, the sources A and B supply pipes K and L, from which the stations are branched in groups by means of systems of distributing pipes E and F, E' and F', and E'' and F''. Each group of distributing pipes has its own set of pressure regulators, such as C and D. The pipes K and L may be of reduced section and subjected without inconvenience to all the fluctuations of the supply pressure plus those which result from pressure drops caused by flow of fluid over a long distance.

Fig. 3 shows, by way of example, one type of pressure regulator which is suitable for use in the systems of Figs. 1 and 2. This regulator is described in detail and claimed in the United States application for patent Serial No. 620,600, filed October 5, 1945, previously mentioned. In Fig. 3, 1 denotes the body of the regulator, 2 the gas supply pipe from the source A or B, 3 an outlet pipe connected to the piping E or F, 4 the valve member operated by the diaphragm 5 and the spring 6, and 7 is a seat for the valve 4.

The diaphragm 5 carries an abutment 8 acting on the end of a lever 9 pivoted about a fixed shaft 10 and connected by a pin 10a to the end of the stem 11 of the valve.

The diaphragm 5 is subjected on its lower face to the downstream pressure to be regulated in chamber 12 of the regulator and on its upper face to the pressure in a chamber 13, which is in communication by a conduit 14 with a fluid tight reservoir 15. The capacity of reservoir 15 is large enough so that the movements of the diaphragm 5 produce only negligible variations in the total volume of chamber 13 plus reservoir 15. This reservoir 15 communicates with the supply pipe 2 by a conduit 16 provided with a stop cock 17. Reservoir 15 also communicates with the downstream pipe 3 by means of a conduit 18 provided with a stop cock 19.

It will be seen that after having filled the reservoir at the regulating pressure which may be indicated by a pressure gauge 28, the diaphragm 5 is subjected on its upper face to an absolutely constant pressure independent of the displacement of the diaphragm and consequently independent of fluctuations in the rate of flow of gas.

In the example shown in Fig. 3 the valve 4 is disposed upstream of its seat 7 so that without some compensating device the downstream pressure of this apparatus will be subjected to variations proportional to the variations of the upstream pressure.

To compensate for this disturbing influence, there is provided an auxiliary or compensating diaphragm 20 subject on one side to the upstream pressure by means of a conduit 21. Diaphragm 20 acts on a projection 22 connected to the lever 9 so that when the upstream pressure acting directly on the valve 4 exerts on it a force in the closing direction, this pressure at the same time acts through diaphragm 20 on the lever 9 in the opposite direction. The lever arms 9 and 22 and the effective areas of the diaphragm and of valve 4 are calculated so as to provide an exact balance of the opposing moments due to the upstream pressure. In other words, the diaphragm 20 and its associated parts balance the valve against variations in the upstream pressure. By reason of these arrangements the downstream pressure remains perfectly constant regardless of variations in the rate of flow and fluctuations of the upstream pressure.

It will be observed that in this construction the diaphragm 5 is held between two plates 23, 24.

The spring 6 which acts on the valve 4 is a long spring working in tension and, occupying the whole width of the body of the apparatus. Its maximum deformation is small as compared to the total spring length, so that the variation in the spring force acting on the valve is small. Furthermore, this spring acts on the valve through the medium of a short arm 25 and the part 10—10a of the lever 9. Because of the ratio of the length of lever arm 25 to the distance 10—10a, the total travel of the valve 4 requires only a very slight deformation of the spring 6. Thus another possible cause of pressure variation is eliminated. At 26 is shown a restricting orifice intended to damp the movements of the valve.

When the valve is disposed downstream of its seat the upstream pressure acts on the valve in an opening direction. In that case, the auxiliary or compensating diaphragm should act on the lever 9 between the pivot 10 and the end of the lever which is actuated by the diaphragm. This and other modifications of the regulator structure are described in the application Serial No. 620,600, filed October 5, 1945, previously mentioned. Fig. 4 shows by way of example one type of stop and check valve which may be substituted for the valves such as G and H in Figs. 1 and 2. This valve comprises a body in two parts 31 and 32, the part 31 comprising an upstream tube 33 connected to the piping E or F and the part 32 providing a downstream tube 34 leading to the burner I. The upstream tube 33 communicates by an opening 35 with an upstream chamber 36 and, in the example illustrated, this communication is controlled by a manually rotatable handle 37, which operates a valve 38 cooperating with a seat 39 which encircles the opening 35.

The non-return valve is interposed between the upstream chamber 36 and a downstream chamber 40 and comprises a flexible diaphragm 41 of large area, on which bears a rigid cup 42 subjected to the action of a light spring 43, the diaphragm and the cup being open at their center to form an outlet orifice 44. The diaphragm is biased by spring 43 to bear on a metal seat 45 of small annular area surrounding a solid part 46 disposed at the center of a disc 47, this disc being provided with orifices 48. The disc 48 and diaphragm 41 are held between the parts 31 and 32 by suitable means (not shown).

When the downstream pressure equals the upstream pressure, the spring 43 presses the diaphragm on the seat 45 and by virtue of the small area of the latter the spring pressure is sufficient to ensure satisfactory tightness. In normal operation, an upstream pressure only slightly greater than the downstream pressure is sufficient to raise the diaphragm, because of the very large area of the latter. Furthermore, the drop in pressure through the valve is minimized by this construction.

The check valve described in my previously mentioned application Serial No. 609,371 may alternatively be used.

In general, moreover, the invention is not limited to the details of construction above described which are given only by way of example.

Having now described my invention what I claim as new and desire to secure by Letters Patent is:

1. In a distribution system for gases for oxyacetylene welding and the like, the combination with a container for supplying oxygen, a container for supplying acetylene, main pipes respectively connected to said containers to carry the respective gases therefrom, and a torch or the like connected to both said pipes for receiving said gases from both said pipes and simultaneously mixing said gases and delivering the mixed gases from said torch, of a gas pressure regulator connected in each main pipe separately to control the pressure of the respective gases from said containers, said regulators each having a valve for controlling the flow of a gas therethrough, means cooperatively associated with each said valve to balance it against variations in the pressure of the gas upstream from the valve, and a movable wall operatively connected to the valve and subjected on one side to the gas pressure downstream from the valve acting in a valve closing sense and on the opposite side to a substantially constant force acting in a valve opening sense, said valve, said wall and said balancing means cooperating to maintain the pressure at the downstream side thereof substantially constant with varying pressure at the upstream side thereof and with varying flow therethrough, said pipes between said regulators and said torch being constructed to provide for flow therethrough of the gases delivered thereto through the respective regulators without substantial drop in the pressure therealong.

2. In a distribution system for gases for oxyacetylene welding and the like, the combination with a container for supplying oxygen, a container for supplying acetylene, main pipes respectively connected to said containers to carry the respective gases therefrom, and a torch or the like connected to both said pipes for receiving said gases from both said pipes and simultaneously mixing said gases and delivering the mixed gases from said torch, of only one gas pressure regulator connected in each main pipe separately to control the pressure of the respective gases from said containers, said regulators each having a valve for controlling the flow of a gas therethrough, means cooperatively associated with each said valve to balance it against variations in the pressure of the gas upstream from the valve, and a movable wall operatively connected to the valve and subject on one side to the gas pressure downstream from the valve acting in a valve closing sense and on the opposite side to a substantially constant force acting in a valve opening sense, said valve, said wall and said balancing means cooperating to maintain the pressure at the downstream side thereof substantially constant with varying pressure at the upstream side thereof and with varying flow therethrough, said pipes between said regulators and said torch being constructed to provide for flow therethrough of the gases delivered thereto through the respective regulators without substantial drop in the pressure therealong.

3. In a distribution system for gases for oxyacetylene welding and the like, the combination with a container for supplying oxygen, a container for supplying acetylene, main pipes respectively connected to said containers to carry the respective gases therefrom, a plurality of branch pipes associated with each of said pipes and connected in parallel thereto, a plurality of torches or the like each connected both to a branch pipe from the oxygen main pipe and to a branch pipe from the acetylene main pipe for receiving gases from both said pipes and simultaneously mixing said gases and delivering the mixed gases from said torch, of only one gas pressure regulator connected in each main pipe separately to control the pressure of the respective gases from said containers, said regulators each having a valve for controlling the flow of a gas therethrough, means cooperatively associated with each said valve to balance it against variations in the pressure of the gas upstream from the valve, and a movable wall operatively connected to the valve and subjected on one side to the gas pressure downstream from the valve acting in a valve closing sense and on the opposite side to a substantially constant force acting in a valve opening sense, said valve, said wall and said balancing means cooperating to maintain the pressure at the downstream side thereof substantially constant with varying pressure at the upstream side thereof and with varying flow therethrough, said main pipes and said branch pipes between said regulators and said torches being constructed to provide for flow therethrough of the gases delivered thereto through the respective regulators without substantial drop in the pressure therealong between said regulators and said torches.

4. In a distribution system for gases for oxyacetylene welding and the like, the combination as defined in claim 1 which comprises a nonreturn valve in each pipe adjacent to the torch supplied thereby to prevent back flow of either gas into the pipe carrying the other gas.

5. In a distribution system for gases for oxyacetylene welding and the like, the combination as defined in claim 1 which comprises a combined stop and non-return valve inserted in each pipe adjacent the torch supplied thereby for separately stopping flow of the respective gases and to prevent back flow of either gas into the pipe carrying the other gas.

6. In a distribution system for gases for oxyacetylene welding and the like, the combination as defined in claim 1 in which said torch is of the nozzle inter-changing type adapted to operate under a substantially constant supply pressure over a wide range of gas output.

7. In a distribution system for gases for oxyacetylene welding and the like, the combination with a container for supplying oxygen, a container for supplying acetylene, main pipes respectively connected to said containers to carry the respective gases therefrom, and a torch or the like connected to both said pipes for receiving said gases from both said pipes and simultaneously mixing said gases and delivering the mixed gases from said torch, of a gas pressure regulator connected in each main pipe separately to control the pressure of the respective gases from said containers, said regulators each having a valve for controlling flow of the gas therethrough, said regulators each having an element responsive to variations in the difference between pressure of the gas upstream of said valve and the pressure downstream of said valve, said regulators each having a second element responsive to variations in the difference between a constant pressure acting on said second element and the pressure of the gas downstream of said valve, both said elements being operatively connected to said valve so as to cooperate to effect respectively opening and closing movements of said valve when the difference between the upstream and downstream pressure increases and decreases and respectively to effect opening and closing movements of said valve when said difference between said constant pressure and downstream pressure increases and decreases, said pipes between said regulators and said torch being constructed to provide for flow therethrough of the gases delivered thereto through the respective regulators without substantial reduction of the pressure therealong.

8. In a distribution system for a fuel gas and a combustion supporting gas, the combination with a source of fuel gas, a source of combustion supporting gas, main pipes respectively connected to said sources to carry the respective gases therefrom, and a burner connected to both pipes for receiving and mixing said gases and delivering the mixed gases, of two gas pressure regulators, one in each main pipe, to separately control the pressure of the respective gases supplied to the burner, each said regulator including a valve, means cooperatively associated with the valve to balance it against variations in the pressure upstream from the valve, and a diaphragm operatively connected to the valve and subjected on one side to the gas pressure downstream from the valve acting in a valve closing sense and on the opposite side to a substantially constant force acting in a valve opening sense, said valve, said diaphragm and said balancing means cooperating to maintain said downstream pressure substantially constant with varying upstream pressure and with varying flow, said pipes being constructed to provide for flow therethrough of the gases without substantial drop in pressure between the regulators and the burner.

ROBERT RENÉ LOUIS GEFFROY.

REFERENCES CITED

The following references are of record in the file of this patent:

UNITED STATES PATENTS

| Number | Name | Date |
| --- | --- | --- |
| 1,762,260 | De Motte et al. | June 10, 1930 |
| 1,879,940 | Mangiameli | Sept. 27, 1932 |
| 1,936,362 | Kennedy | Nov. 21, 1933 |
| 1,984,868 | Deming | Dec. 18, 1934 |